(12) United States Patent
Merker et al.

(10) Patent No.: US 10,423,619 B2
(45) Date of Patent: Sep. 24, 2019

(54) QUERY PLAN GENERATION FOR PRECOMPILED AND CODE GENERATING QUERY OPERATIONS

(71) Applicant: SAP SE, Walldorf (DE)

(72) Inventors: Till Merker, Sandhausen (DE);
Wolfgang Stephan, Heidelberg (DE);
Mortiz Thomas, Walldorf (DE)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 15/363,380

(22) Filed: Nov. 29, 2016

(65) Prior Publication Data

US 2018/0150512 A1    May 31, 2018

(51) Int. Cl.
    *G06F 16/2453* (2019.01)
(52) U.S. Cl.
    CPC .............. *G06F 16/24542* (2019.01)
(58) Field of Classification Search
    CPC ................................ G06F 16/24542
    See application file for complete search history.

(56) References Cited

U.S. PATENT DOCUMENTS

| | | | |
|---|---|---|---|
| 5,918,225 A | 6/1999 | White et al. | |
| 7,174,553 B1 | 2/2007 | Reed et al. | |
| 7,797,342 B2 | 9/2010 | Banks et al. | |
| 8,977,600 B2 | 3/2015 | Crupi et al. | |
| 9,165,021 B2 | 10/2015 | Bhattacharjee et al. | |
| 9,298,768 B2 | 3/2016 | Varakin et al. | |
| 2004/0015511 A1 | 1/2004 | Seefeldt et al. | |
| 2004/0162822 A1* | 8/2004 | Papanyan | G06F 17/30415 |
| 2005/0028134 A1* | 2/2005 | Zane | G06F 8/30 717/106 |
| 2007/0250470 A1 | 10/2007 | Duffy et al. | |
| 2008/0033960 A1 | 2/2008 | Banks et al. | |
| 2008/0281846 A1 | 11/2008 | Hoang et al. | |
| 2009/0006429 A1 | 1/2009 | Champion et al. | |
| 2009/0030874 A1 | 1/2009 | Das et al. | |
| 2010/0262633 A1 | 10/2010 | Bhattacharjee et al. | |
| 2010/0281017 A1 | 11/2010 | Hu et al. | |

(Continued)

OTHER PUBLICATIONS

Neumann, Thomas. "Efficiently compiling efficient query plans for modern hardware." Proceedings of the VLDB Endowment 4.9 (2011): 539-550.

*Primary Examiner* — Jensen Hu
(74) *Attorney, Agent, or Firm* — Mintz Levin Cohn Ferris Glovsky and Popeo, P.C.

(57) ABSTRACT

A system for generating a query plan is provided. In some implementations, the system performs operations comprising: translating, into corresponding code, a query operation in a query plan comprising a sequence of query operations; determining a context for the translating of the query operation, the context corresponding to whether the query operation comprises a pre-compiled query operation or a code-generating query operation; and inserting adaptor code between code for the query operation and code for one or more previous query operations in the sequence of query operations, when a change in context is detected between the translating of the query operation and a translation of the one or more previous query operations. Related methods and articles of manufacture are also described.

14 Claims, 5 Drawing Sheets

(56) References Cited

U.S. PATENT DOCUMENTS

| | | |
|---|---|---|
| 2013/0054630 A1* | 2/2013 | Briggs ............... G06F 17/30389 |
| | | 707/760 |
| 2013/0151502 A1 | 6/2013 | Yoon et al. |
| 2014/0280030 A1* | 9/2014 | Freedman ......... G06F 17/30436 |
| | | 707/718 |
| 2014/0280037 A1 | 9/2014 | Petride et al. |
| 2014/0351233 A1 | 11/2014 | Crupi et al. |
| 2015/0026154 A1* | 1/2015 | Jeong ............... G06F 17/30569 |
| | | 707/718 |
| 2015/0178305 A1 | 6/2015 | Mueller et al. |
| 2015/0186461 A1 | 7/2015 | Nica |
| 2015/0193500 A1* | 7/2015 | Aute ................ G06F 17/30463 |
| | | 707/714 |
| 2015/0269228 A1 | 9/2015 | Fisher et al. |
| 2017/0024433 A1 | 1/2017 | Neelakanthappa et al. |
| 2017/0228425 A1 | 8/2017 | Kandula et al. |
| 2018/0150513 A1 | 5/2018 | Willems et al. |

* cited by examiner

QUERY PLAN GENERATION FOR PRECOMPILED AND CODE GENERATING QUERY OPERATIONS

TECHNICAL FIELD

The subject matter described herein relates to database management, and more particularly, to the generation of query execution plans.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In one aspect, a method, system, and articles of manufacture, including a computer program product, are provided. A method may include: translating, into corresponding code, a query operation in a query plan comprising a sequence of query operations; determining a context for the translating of the query operation, the context corresponding to whether the query operation comprises a pre-compiled query operation or a code-generating query operation; and inserting adaptor code between code for the query operation and code for one or more previous query operations in the sequence of query operations, when a change in context is detected between the translating of the query operation and a translation of the one or more previous query operations. In some variations, the method may further include combining code for the query operation and code for the one or more previous query operations to at least form a continuous segment of code for the query plan.

In some variations, the context for translating the query operation may be a code generating mode, when the query operation comprises a code-generating query operation. As such, the translating of the query operation may include triggering a dynamic generation of the corresponding code for the query operation. Moreover, the one or more previous query operations may be pre-compiled query operations. Accordingly, the adaptor code may be code configured to decompose a data chunk output by the one or more previous query operations. The data chunk may be decomposed into a plurality of rows of data that the query operation is able to operate on.

In some variations, the context for translating the query operation may be a non-code generating mode, when the query operation comprises a pre-compiled query operation. As such, the translating of the query operation may include inserting, into code for the query plan, existing code for the query operation. Moreover, the one or more previous query operations may be code-generating query operations. The adaptor code may be code configured to recompose a plurality of rows of data output by the one or more previous query operations. The plurality of rows of data may be recomposed into one or more data chunks that the query operation is able to operate on.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
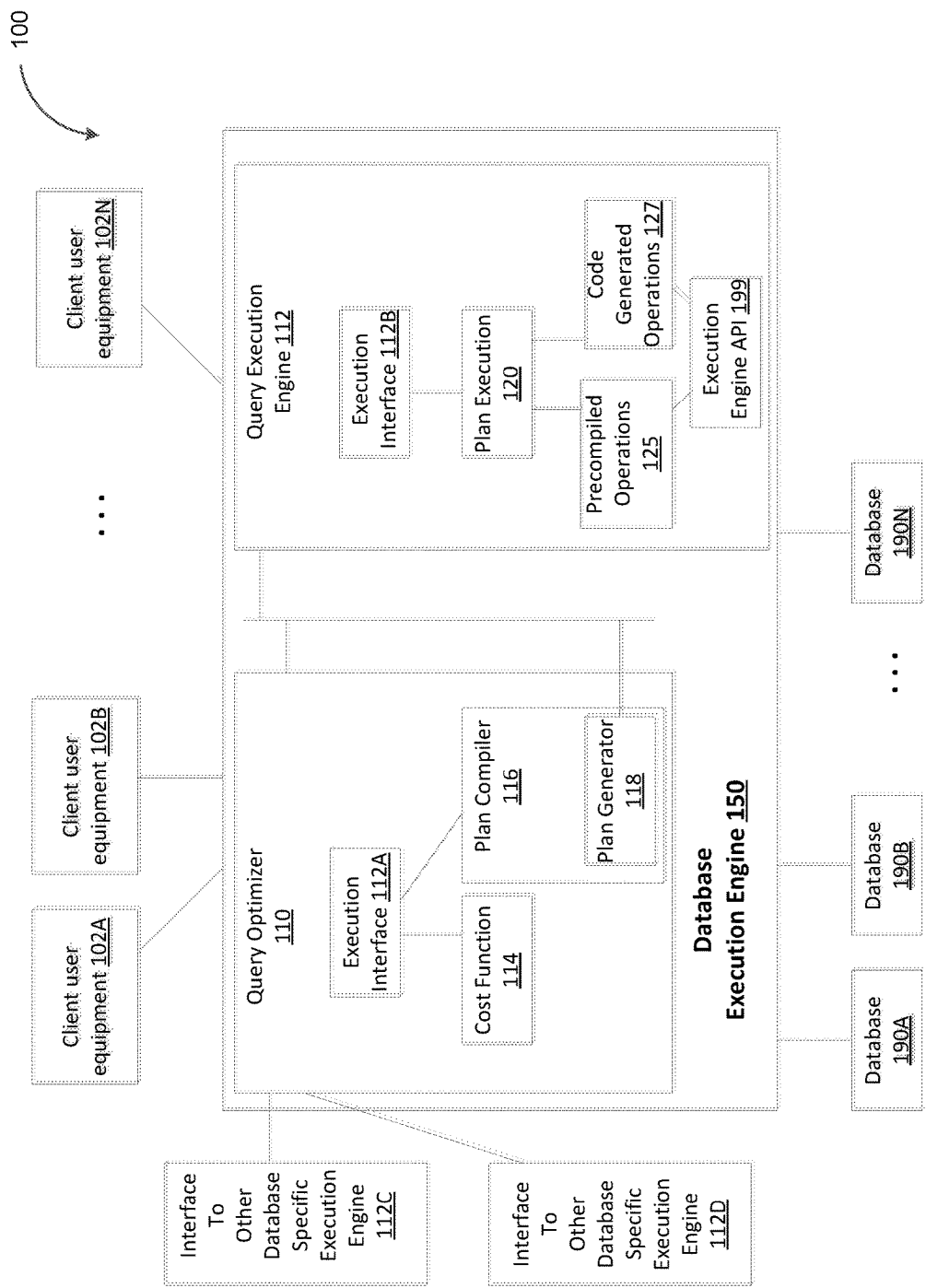
FIG. 1 depicts a block diagram for a system, in accordance with some example embodiments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have lighter weight and/or readily deployable applications. On the other hand, pushing complex operations to the database layer where data is stored may draw processing and/or memory resources at the database layer and may thus reduce the performance and response times for queries.

In some example embodiments, there may be provided an execution engine that may decouple the application layer from the database layer (e.g., the persistence or storage layer where data including database tables may be stored and/or queried). The execution engine may be separate from the database layer and the client application layer. According to some example embodiments, the execution engine may be configured to receive a query, generate a query plan (e.g., that includes one or more executable query operations. The execution engine may be further configured to optimize the query plan and compile the query plan by generating executable code (e.g., machine code) corresponding to the query plan.

Some of the query operations included in the query plan may be executed by the execution engine itself. For instance, more complex query operations (e.g., rule-based query operations such as joins, projections, and/or the like) may be performed by the execution engine itself. For query operations that are performed by the query engine itself, the query engine may perform these query operations while accessing the database layer whenever necessary in order to read, write, update, and/or perform other operations on the data stored and/or persisted at the database layer. Meanwhile, the query plan may also include query operations that are delegated to the database layer. These query operations may be relatively basic query operations including, for example, SQL commands (e.g., reads, writes, scans, and/or the like). For query operations that are delegated to the database layer, the execution engine may receive corresponding responses from the database layer where data is stored and these query operations (e.g., SQL commands such as reads, writes, scans, and/or the like) are performed.

In some example embodiments, the generating of a query plan for a query may include translating the query into code (e.g., in a high-level programming language such as C++, a low-level assembly language such as low level virtual-machine (LLVM) assembly language, and/or other types of code) that can be compiled into machine code. Since the query may include a sequence of query operations, the execution engine may be configured to translate, into corresponding code, each query operation in the sequence of query operations. According to some example embodiments, the execution engine may be configured to implement a mixed execution model in which the sequence of query operations may include both code-generating query operations and pre-compiled query operations. The optimization of a query plan may include designating query operations in the query plan as pre-compiled query operations or code-generating query operations.

In some example embodiments, pre-compiled query operations may be associated with existing code (e.g., manually generated code in a high level programming language) that is inserted into query plan during the generating of the query plan. For instance, complex and/or infrequently executed query operations may be implemented as pre-compiled query operations. Doing so may ensure that complex query operations are being implemented with code providing optimal performance and that the time required for eventually compiling the code (e.g., into machine code) is in check. However, it should be appreciated that any query operation may be implemented as a pre-compiled query operation. According to some example embodiments, the same query operation (e.g., a join operation) may be designated as a pre-compiled query operation during the optimization of one query plan but as a code-generating query operation during the optimization of a different query plan.

By contrast, code-generating query operations may be associated with code (e.g., in a low-level assembly language) that is dynamically generated during the generating of the query plan. Relatively basic and/or frequently executed query operations may be implemented as code-generating query operations. The dynamic generation of code for basic and/or frequently executed query operations may obviate the inconvenience and weaknesses associated with the manually generated code used to implement pre-compiled query operations. Similarly, it should be appreciated that any query operation may be implemented as a code-generating query operation. For instance, the same query operation (e.g., a join operation) may be designated as a code-generating query operation during the optimization of one query plan but as a pre-compiled query operation during the optimization of a different query plan.

It should be appreciated that the designation of various query operations as pre-compiled and/or code-generating may be dependent on different and/or additional factors, metrics, and/or considerations. For instance, certain query operations may be designated as pre-compiled query operations including, for example, joins, table scans, reads from table columns, query operations on bulk data (e.g., table scans and/or the like which process multiple rows of data at once), and query operations that are not performance critical. Other query operations may be designated as code-generating query operations including, for example, arithmetic calculations, reads from dictionaries, joins with complex predicates (e.g. T1 Join T2 ON T1.X+T2.Y>T2.A*42/T2.B), aggregations on calculated expressions (e.g., SUM(X+Y)), and sorting on calculated expressions. Because code-generating query operations may be tailored to a specific query at runtime, any query operation can be designated as a code-generating query operation in order to avoid the overhead associated with pre-compiled query operations, which have to be generic in order to be suitable for multiple queries. As such, the performance optimization associated with code-generating query operations can be desirable even when the underlying query operation is not complex.

In some example embodiments, pre-compiled query operations and code-generating query operations may operate on and output different units of data. For instance, code-generating query operations may operate on and output individual rows of data while pre-compiled query operations may operate on and output data chunks that include multiple rows of data (e.g., from a database table). Accordingly, to generate an executable query plan for a query having both code-generating query operations and pre-compiled query operations, a plan compiler may insert, between code for one or more pre-compiled query operations and code for one or more code-generating query operations, adaptor code configured to decompose data chunks into one or more constituent rows of data and/or recompose rows of data into one or more data chunks.

In some example embodiments, the execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform execution of a query plan for both types and send queries to the different types of database layers (and/or their storage/persistence layer) and handle the corresponding responses.

FIG. 1 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and columns from Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimized query plan, which may represent query algebra or relational algebra, as noted above. To compile a query plan, the query optimizer 110 may provide the query plan to the query plan compiler 116 to enable compilation of some, if not all, of the code (e.g., for a query plan into machine code. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, the query plan compiler 116 may select pre-compiled code for a given operation as part of the optimization of the query plan, while for another operation in the query plan the plan compiler 116 may allow a compiler to generate the code. The pre-compiled and generated code represent code for executing the query plan, and this code may be provided to the plan generator 118, which interfaces the query execution engine 112.

In some example embodiments, the query plan compiler 116 may generate a query plan by at least translating the query plan into corresponding code. For instance, the query plan compiler 116 may combine the existing code for the pre-compiled query operations 125 with the dynamically generated code for the code-generating query operations 127. Moreover, because the pre-compiled query operations 125 and the code-generating query operations 127 may operate on and output different units of data, the query plan compiler 116 may insert adaptor code between the code corresponding to the pre-compiled query operations 125 and the code corresponding to the code-generating operations 127.

For instance, the pre-compiled query operations 125 may operate on individual rows of data while the code-generating query operations 127 may operate on data chunks that include multiple rows of data (e.g., from a database table). As such, for one or more pre-compiled query operations that follow one or more code-generating query operations, the query plan compiler 116 may insert, between the code for the pre-compiled query operation and the code for the preceding code-generating operations, adaptor code configured to decompose the data chunks output by the code-generating operations into one or more constituent rows of data that may be operated on by the pre-compiled query operation. Alternately and/or additionally, for one or more code-generating operations that follow one or more pre-compiled query operations, the query plan compiler 116 may insert, between the code for the code-generating query operations and the code for the preceding pre-compiled query operations, adaptor code configured to recompose the rows of data output by the pre-compiled query operations into data chunks that can be operated on by the code-generating query operation.

In some example embodiments, the query plan compiler 116 may generate a query plan that includes both full table query operations and split table query operations. A full table query operation may operate on tables as a whole because performing the operation may include simultaneously loading, examining and/or altering all of the data in the table. For example, sorting the rows of a table (e.g., a SQL ORDER BY command) and hash joining two or more tables are full table query operations that may be performed on tables as a whole. By contrast, a split table query operation may operate on portions of a table because the performing the operation may include separately loading, examining, and/or altering data from individual portions of the table. For instance, filtering, materialization (e.g., projection), and equipartitioned joins (e.g., between two table partitions) may be split table query operations that can be performed on individual portions of a table and not on the table as a whole. According to some example embodiments, the execution engine may replace a single split table query operation in the query plan with a plurality of parallel operations that each operates on a portion (e.g., partition and/or fragment) of the table.

In some example embodiments, to generate a query plan that includes both full table query operations and split table query operations, the query plan compiler 116 may insert one or more switch operations. According to some example embodiments, a switch operation may be inserted between a full table query operation and a split table query operation. A full table query operation may output a data chunk corresponding to a table in its entirety while a subsequent split table query operation operates on only portions (e.g., partition and/or fragment) of the table. As such, the switch operation may be configured to distribute data from the data chunk output by the full table query operation to each of the parallel operations forming the split table query operation.

In some example embodiments, the query plan compiler may be further configured to compile code in both high-level programming languages (e.g., C++) and low-level assembly language (e.g., low level virtual machine assembly language) into executable code, which may be directly executed by a computer processor and/or processing circuitry (e.g., numerical machine code and/or the like). The database execution engine 150 may further include a plan generator 118 configured to provide, to the query execution engine 112, the query plan subsequent to compilation by the plan compiler 116.

In some example embodiments, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, a query plan that has been generated and/or optimized by the query optimizer 110 and compiled by the plan compiler 116. It should be appreciated that the query execution engine 112 may also receive query plans and/or queries directly from a higher-level application or another device, such as user equipment 102A-N. The query execution engine 112 may then forward, via an execution interface 112B, the query plan to a plan execution engine 120. According to some example embodiments, the plan execution engine 120 may step through the query plan and determine to perform some of the query operations from the query plan within the database execution engine 150 and delegate other query operations for execution at one or more of the database layers 190A-N. Query operations delegated to the database layers 190A-N may be sent, to one or more of the database layers 190A-N, via an execution engine application programming interface (API).

To illustrate further, Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operation at Table 1 would result in a call for a dictionary look up for a value "X," an indexvector scan with a valueid obtained from the dictionary look up, which results in a document ID list. Then for each document ID, a call is made to look up the value IDs for columns A and B. The value IDs may be used to look up dictionary values to materialize the columns A and B including the actual data values for those columns.

TABLE 1

| Operation | Calls made on Database API |
| --- | --- |
| 1) TableScan (Filter X = 1) | dictionary lookup column X for the value ID of "1" indexvector scan with a valueid from the lookup, which results in a document ID (docid) list that identifies one or more rows in Table 1 |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may perform these and other complex operations as part of a query plan, while the database's persistence/storage layer 190A-N can perform simpler operations to reduce the processing burden at the database's persistence/storage layer 190A-N.

In some example embodiments, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

Figure 2:
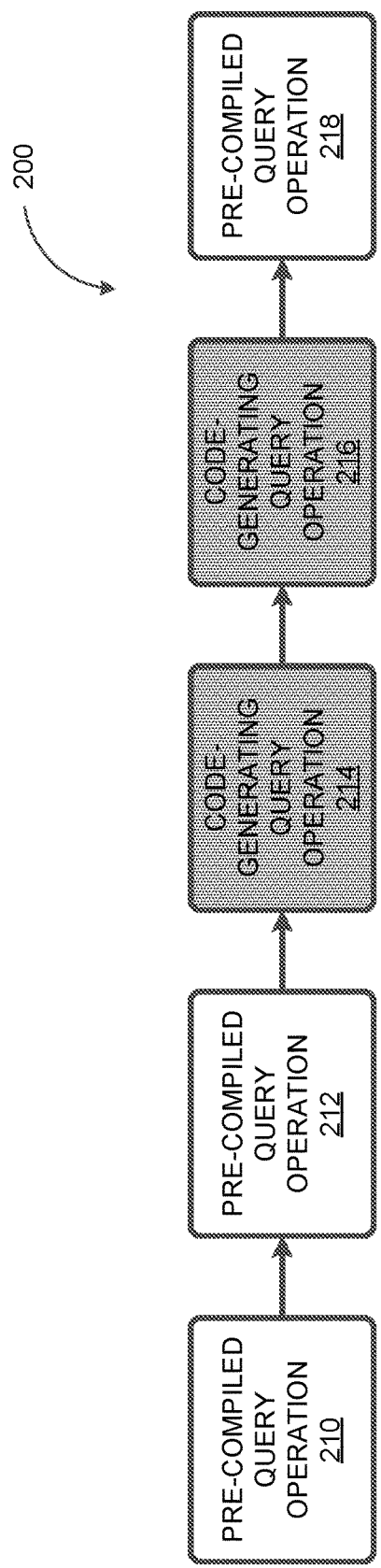
FIG. 2 depicts a query plan, in accordance with some example embodiments.

FIG. 2 depicts a query plan 200, in accordance with some example embodiments. Referring to FIGS. 1-2, the query plan 200 may correspond to the query algebra or relational algebra that the query optimizer 110 may generate for a particular query. The query plan 200 may include a plurality of consecutive query operations including, for example, a first query operation 210, a second query operation 212, a third query operation 214, a fourth query operation 216, and a fifth query operation 218. As an example, the first query operation 210 may be a table scan operation, the second query operation 212 may be a read operation, the third query operation 214 may be a read dictionary operation, the fourth operation 216 may be a mathematical operation (e.g., addition, subtraction, multiplication, division), and the fifth operation 218 may be a send operation (e.g., sending the results of the query plan 200 to one or more user equipment 102A-N).

In some example embodiments, the query plan 200 reflects the mixed execution model implemented by the database execution engine 150. As such, the query plan 200 may include both pre-compiled query operations and code-generating query operations. For instance, as shown in FIG. 2, the first query operation 210, the second query operations 212, and the fifth query operation 218 may be pre-compiled query operations associated with existing code (e.g., manually generated code in a high-level programming language). Meanwhile, the third query operation 214 and the fourth query operation 216 may be code-generating query operations associated with code (e.g., in a low-level assembly language) that is dynamically generated (e.g., during the translation of the query plan 200 by the query plan compiler 116).

In some example embodiments, the compiling of the query plan 200 (e.g., by the query plan compiler 116) includes translating, in a sequential manner, the query plan 200 into corresponding code. For instance, the query plan compiler 116 may translate the query plan 200 into corresponding code by at least inserting existing code (e.g., manually generated code in a high level programming language) into the code for the query plan, when the query plan compiler 110 encounters the first query operation 210, the second query operation 212, and/or the fifth query operation 218. Existing code associated with consecutive pre-compiled query operations (e.g., the first query operation 210 and the second query operation 212) may be combined to form a continuous segment of code. Alternately and/or additionally, the query plan compiler 116 may translate the query plan 200 into corresponding code by at least triggering the dynamic generation of code (e.g., low level assembly code by a Low Level Virtual Machine (LLVM) compiler), when the query plan compiler 116 encounters the third query operation 214 and/or the fourth query operation 216. Dynamically generated code associated with consecutive code-generating query operations (e.g., the third query operation 214 and the fourth query operation 216) may also be combined to form a continuous segment of code.

The translating of the query plan 200 into corresponding code includes inserting adaptor code between the code for pre-compiled query operations and code-generating query operations. Adaptor code may be code that is configured to convert the output of one query operation into input that may be processed by a subsequent query operation. For instance, adaptor code can be configured to decompose data chunks into one or more constituent rows of data and/or recompose rows of data into one or more data chunks. According to some example embodiments, the query plan compiler 116 may be configured to track the context of the translation being performed by the query plan compiler 116. The context of the translation may correspond to whether a query operation currently being translated by the query plan compiler 116 requires the query plan compiler 116 to be in a code generating mode. For instance, the query plan compiler 116 may track the context of the translation via a context flag that corresponds to whether the query plan compiler 116 is in a code generating mode. The context flag may be turned on and/or set to a certain value whenever the query plan compiler 116 is translating a code-generating query operation that requires the query plan compiler 116 to be in a code generating mode. Alternately and/or additionally, the context flag may be turned off and/or set to a different value whenever the query plan compiler 116 is translating a pre-compiled query operation that does not require the query plan compiler 116 to be in a code generating mode.

According to some example embodiments, adaptor code may be inserted whenever the query plan compiler 116 detects (e.g., based on the flag) a change in the context of translation between two consecutive query operations. For instance, when the query plan compiler 116 is translating the first query operation 210 and/or the second query operation 212, the context may indicate that the query plan compiler 110 is not in a code generating mode since both the first query operation 210 and the second query operation 212 are pre-compiled query operations. Thus, the context flag may be turned off during the translation of the first query operation 210 and the second query operation 212. However, when the query plan compiler 110 is translating the third query 214, the query plan compiler 110 may determine that translating the third query operation 214 requires the query plan compiler 110 to be in a code generating mode. As such, the query plan compiler 110 may be required to change the context flag to correspond to the change in the context of translation between the second query operation 212 and the third query operation 214. The query plan compiler 110 may detect, based on the changing of the context flag, a change in context that necessitates the insertion of adaptor code. For example, when the query plan compiler 110 turns on the context flag and/or changes the value of the context flag to indicate a change from a non-code generating mode to a code generating mode, the query plan compiler 110 may insert adaptor code configured to decompose data chunks (e.g., operated on and output by the second query operation 212) into one or more constituent rows of data (e.g., that can be operated on by the third query operation 214).

Table 2 below depicts pseudocode corresponding to adaptor code configured to decompose data chunks. As shown in Table 2, the adaptor code may be configured to iterate over each row in a data chunk output by one or more pre-compiled query operations (e.g., the first query operation 210 and/or the second query operation 212) and provide the data at each row individually as input into one or more code-generating query operations (e.g., the third query operation 214 and/or the fourth query operation 216).

TABLE 2

For Row in InputChunk
{
    vidA = row.column[0]
    vidB = row.column[1]
    valueA = dictionary[vidA]
    valueB = dictionary[vidB]
}

In some example embodiments, the query plan compiler 110 may detect another change in context when the query plan compiler 110 is translating the fifth query operation 218 subsequent to translating the third query operation 214 and/or fourth query operation 216. For instance, when the query plan compiler 110 is translating the third query operation 214 and/or the fourth query operation 216, the context may indicate that query plan compiler 110 is in a code generating because both the third query operation 214 and the fourth query operation 216 are code-generating query operations. When the query plan compiler 110 is translating the fifth query 218, the query plan compiler 110 may determine that the translating of the fifth query 218 no longer requires the query plan compiler 210 to be in a code generating mode. Accordingly, the query plan compiler 110 may be required to change the context flag to correspond to the change in the context between the fourth query 216 and the fifth query 218. The query plan compiler 110 may detect, based on the changing of the context flag, another change in context that necessitates the insertion of adaptor code. In particular, when the query plan compiler 110 turns off the context flag and/or changes the value of the context flag to indicate a change from a code generating mode to a non-code generating mode, the query plan compiler 110 may insert adaptor code configured to recompose rows of data (e.g., operated on and output by the fourth query operation 216) into data chunks (e.g., that can be operated on by the fifth query operation 218).

Table 3 below depicts pseudocode corresponding to adaptor code configured to decompose data chunks. As shown in Table 3, the adaptor code may be configured to populate each row in a data chunk (e.g., that can be operated on by the fifth query operation 218) with individual rows of data (e.g., operated on and output by the fourth query operation 216).

TABLE 3

```
For Row in InputChunk
{
    result = valueA + valueB * 7
    outRow = OutputChunk.addRow( )
    outRow.column[0] = result
}
```

Figure 3:
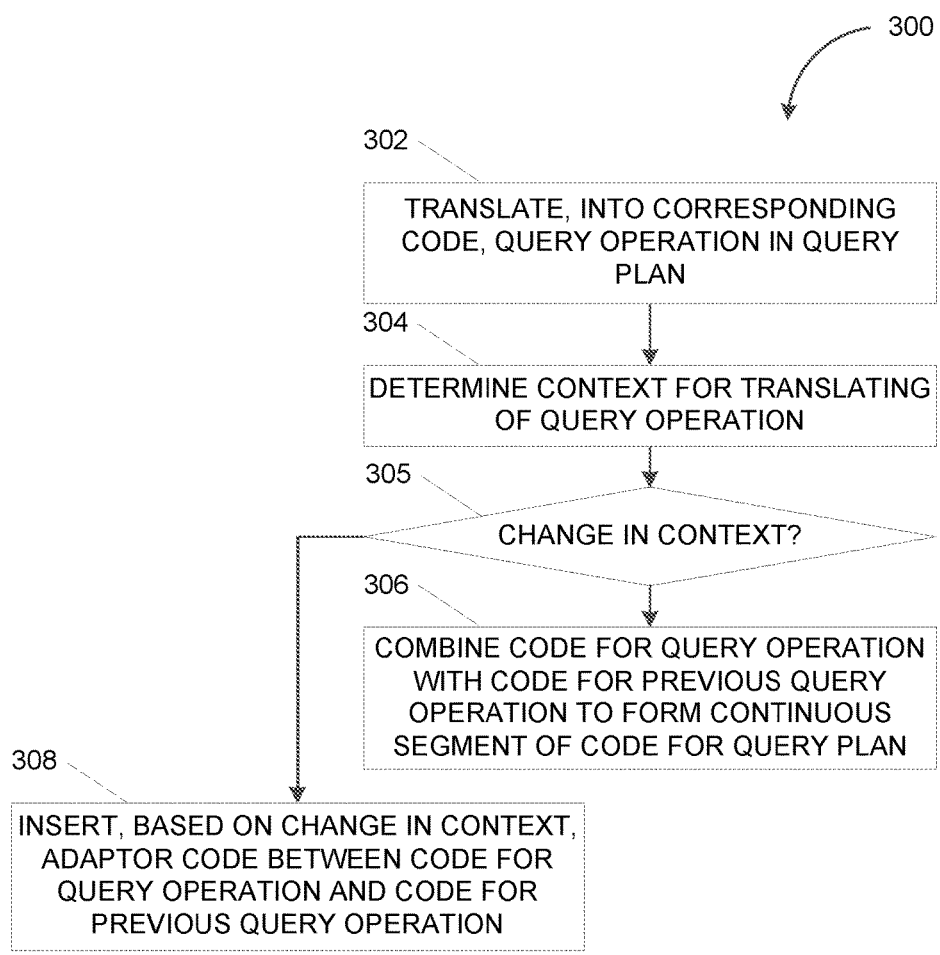
FIG. 3 depicts a flowchart illustrating a process for translating a query plan into corresponding code, in accordance with some example embodiments.

FIG. 3 depicts a flowchart illustrating a process 300 for translating a query plan into corresponding code, in accordance with some example embodiments. Referring to FIGS. 1-3, the process 300 may be performed by the database execution engine 150.

The database execution engine 150 may translate, into corresponding code, a query operation in a query plan that includes a sequence of query operations (302). For example, the database execution engine 150 may implement a mixed execution model. As such, the query operation may be a pre-compiled query operation that is associated existing code (e.g., manually generated code in a high-level programming language such as C++ and/or the like) and the database execution engine 150 may translate the query operation by at least inserting the existing code for the query operation into the code for the query plan. Alternately, the query operation may be a code-generating query operation associated with dynamically generated code (e.g., in a low-level assembly language such as low level virtual-machine assembly language and/or the like) and the database execution engine 150 may translate the query operation by at least triggering the dynamic generation of the corresponding code for the query operation (e.g., by a low-level assembly language compiler).

The database execution engine 150 may determine a context for the translating of the query operation (304). For instance, the database execution engine 150 (e.g., the query plan compiler 110) may determine whether the translating of the query operation requires the database execution engine 150 to be in a code generating mode or a non-code generating mode.

The database execution engine 150 may not detect, based at least on the context for translating the query operation, a change in context between the translating of the query operation and a context for translating one or more previous query operations in the sequence of query operations (305-N). For example, the database execution engine 150 (e.g., the query plan compiler 110) may maintain a context flag in order to track the context for translating the query operation. The database execution engine 150 may turn on the context flag and/or set the context flag to a certain value when the database execution engine 150 is in a code generating mode while translating a code-generating query operation. Alternately, the database execution engine 150 may turn off the context flag and/or set the context flag to a different value when the database execution engine 150 is in a non-code generating mode while translating a pre-compiled query operation. Thus, the database execution engine 150 may detect a change in context based at least on whether the database exertion engine 150 is required to change the on/off state and/or value of the context flag from one or more previous query operations.

When the database execution engine 150 does not detect a change in context, the database execution engine 150 may combine code for the query operation with code for the one or more previous query operations to form a continuous segment of code for the query plan (306). For example, the query operation and the one or more previous query operations may all be code-generating query operations. As such, the database execution engine 150 is not required to change the context flag because the database execution engine 150 remains in the same code generating mode when the database execution engine 150 is translating the query operation as when the database execution engine 150 is translating the one or more previous query operations. Alternately and/or additionally, the query operation and the one or more previous query operations may all be pre-compiled query operations. Here, the database exertion engine 150 is also not required to change the context flag because the database execution engine remains in the same non-code generating mode when the database execution engine 150 is translating the query operation as when the database execution engine 150 is translating the one or more previous query operations. In both scenarios, the database execution engine 150 may combine code for the query operation with code for the one or more previous query operations to form a continuous segment of code for the query plan.

Alternately and/or additionally, the database execution engine 150 may detect, based at least on the context for translating the query operation, a change in context between the query operation and one or more previous query operations in the sequence of query operations (305-Y). As such, the database execution engine 150 may insert, based at least on the change in context, adaptor code between the code for the query operation and the code for the one or more previous query operations (308). For instance, the query operation may be a code-generating query operation that is preceded by one or more pre-compiled query operations. Alternately and/or additionally, the query operation may be a pre-compiled query operation that is preceded by one or more code-generating query operations. Here, the database execution engine 150 (e.g., the query plan compiler 110) may be required to change the context flag to reflect a change in context between the translating of the query operation and the one or more previous query operations in the query plan. Accordingly, the database execution engine 150 may insert adaptor code between the code for the query operation and the code for the one or more previous query operations. According to some example embodiments, the adaptor code may be code that is configured to decompose data chunks into one or more constituent rows of data and/or recompose rows of data into one or more data chunks.

Figure 4:
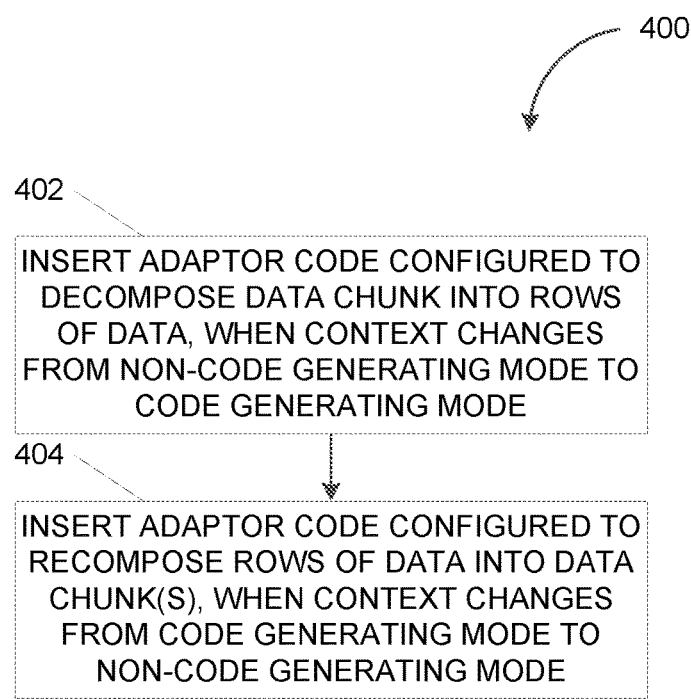
FIG. 4 depicts a flowchart illustrating a process for inserting adaptor code, in accordance with some example embodiments.

FIG. 4 depicts a flowchart illustrating a process 400 for inserting adaptor code, in accordance with some example embodiments. Referring to FIGS. 1-4, the process 400 may be performed by the database execution engine 150 and may implement operation 308 of the process 300.

The database execution engine 150 may insert adaptor code configured to decompose a data chunk into a plurality of rows of data, when the context changes from a non-code generating mode to a code generating mode (402). For example, the database execution engine 150 (e.g., the query plan compiler 110) may translate the code-generating third query operation 214 subsequent to translating the pre-compiled second query operation 212. In this scenario, the database execution engine 150 may detect a context change when the database execution engine 150 is required to turn on the context flag and/or change the value of the context flag to reflect a transition from a non-code generating mode (e.g., for translating the second query operation 212) to a code-generating mode (e.g., for translating the third query operation 214). Accordingly, the database execution engine 150 may insert, between the code for the second query operation 212 and the third query operation 214, adaptor code that is configured to decompose the data chunks output by the second query operation 212 into rows of data that the third query operation 214 is able to operate on.

Alternately and/or additionally, the database execution engine 150 may insert adaptor code configured to recompose a plurality of rows of data into one or more data chunks, when the context changes from a code generating mode to a non-code generating mode (404). For example, the database execution engine 150 (e.g., the query plan compiler 110) may translate the pre-compiled fifth query operation 218 subsequent to translating the code-generating fourth query operation 216. Here, the database execution engine 150 may detect a context change when the database execution engine 150 is required to turn off the context flag and/or change the value of the context flag to reflect a transition from a code-generating mode (e.g., for translating the fourth query operation 216) to a non-code generating mode (e.g., for translating the fifth query operation 218). Thus, the database execution engine 150 may insert, between the code for the fourth query operation 216 and the fifth query operation 218, adaptor code that is configured to recompose the rows of data output by the fourth query operation 216 into one or more chunks of data that the fifth query operation 218 is able to operate on.

Figure 5:
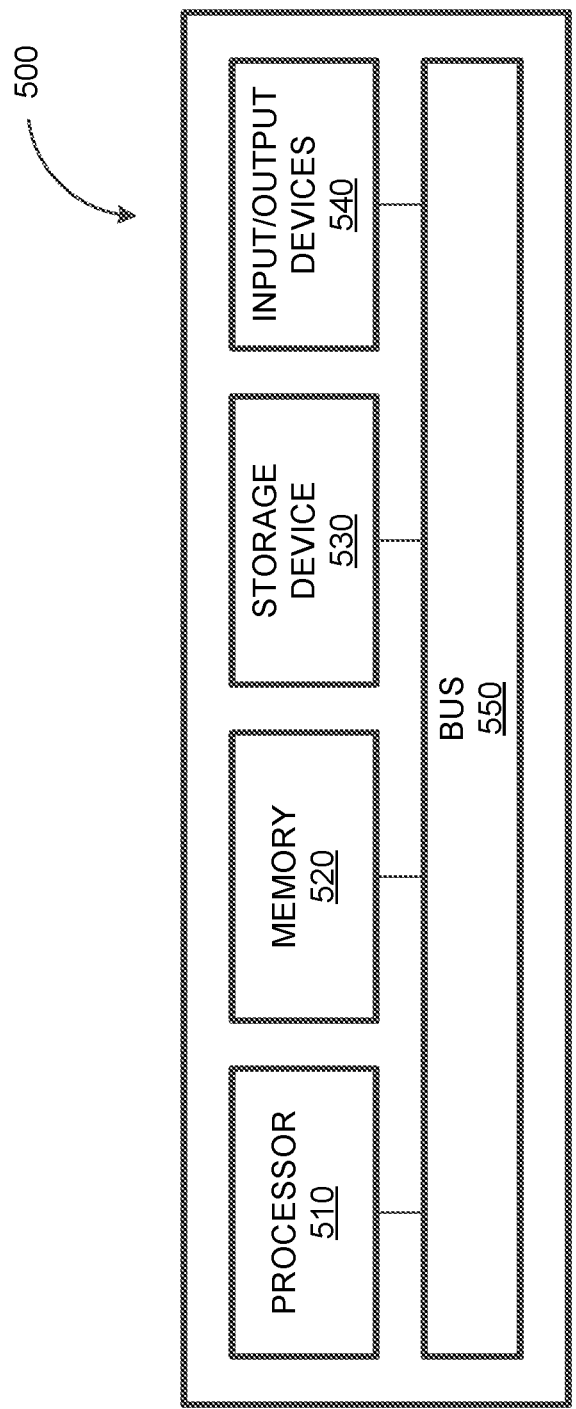
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the execution engine 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   translating, into corresponding code, a query operation in a query plan comprising a sequence of query operations;
   determining a context for the translating of the query operation, the context corresponding to whether the query operation comprises a pre-compiled query operation or a code-generating query operation, the context for the translating of the query operation comprising a code generating mode when the query operation comprises a code-generating query operation;
   detecting a change in context between the translating of the query operation and a translation of one or more previous query operations comprising pre-compiled query operations;
   in response to detecting the change in context, inserting, between code for the query operation and code for the one or more previous query operations in the sequence of query operations, adaptor code configured to decompose a data chunk output by the one or more previous query operations into a plurality of rows of data that the query operation is able to operate on.

2. The system of claim 1, wherein the translating of the query operation comprises triggering a dynamic generation of the corresponding code for the query operation, when the context for the translating of the query operation comprises the code generating mode.

3. The system of claim 1, wherein the context for translating the query operation comprises a non-code generating mode, when the query operation comprises a pre-compiled query operation.

4. The system of claim 3, wherein the translating of the query operation comprises inserting, into code for the query plan, existing code for the query operation, when the context for the translating of the query operation comprises the non-code generating mode.

5. The system of claim 3, further comprising:
   responding to the change in the context between the translating of the query operation and the translation of the one or more previous query operations comprising code-generating query operations by at least inserting, between the code for the query operation and the code for the one or more previous query operations, adaptor code configured to recompose a plurality of rows of data output by the one or more previous query operations into one or more data chunks that the query operation is able to operate on.

6. The system of claim 1, further comprising:
combining code for the query operation and code for the one or more previous query operations to at least form a continuous segment of code for the query plan.

7. A computer-implemented method, comprising:
translating, into corresponding code, a query operation in a query plan comprising a sequence of query operations;
determining a context for the translating of the query operation, the context corresponding to whether the query operation comprises a pre-compiled query operation or a code-generating query operation, the context for the translating of the query operation comprising a code generating mode when the query operation comprises a code-generating query operation;
detecting a change in context between the translating of the query operation and a translation of one or more previous query operations comprising pre-compiled query operations;
in response to detecting the change in context, inserting, between code for the query operation and code for the one or more previous query operations in the sequence of query operations, adaptor code configured to decompose a data chunk output by the one or more previous query operations into a plurality of rows of data that the query operation is able to operate on.

8. The method of claim 7, wherein the translating of the query operation comprises triggering a dynamic generation of the corresponding code for the query operation, when the context for the translating of the query operation comprises the code generating mode.

9. The method of claim 7, wherein the context for translating the query operation comprises a non-code generating mode, when the query operation comprises a pre-compiled query operation.

10. The method of claim 9, wherein the translating of the query operation comprises inserting, into code for the query plan, existing code for the query operation, when the context for the translating of the query operation comprises the non-code generating mode.

11. The method of claim 9, further comprising:
responding to the change in the context between the translating of the query operation and the translation of the one or more previous query operations comprising code-generating query operations by at least inserting, between the code for the query operation and the code for the one or more previous query operations, adaptor code configured to recompose a plurality of rows of data output by the one or more previous query operations into one or more data chunks that the query operation is able to operate on.

12. A non-transitory computer-readable storage medium including program code which when executed by at least one processor causes operations comprising:
translating, into corresponding code, a query operation in a query plan comprising a sequence of query operations;
determining a context for the translating of the query operation, the context corresponding to whether the query operation comprises a pre-compiled query operation or a code-generating query operation, the context for the translating of the query operation comprising a code generating mode when the query operation comprises a code-generating query operation;
detecting a change in context between the translating of the query operation and a translation of one or more previous query operations comprising pre-compiled query operations;
in response to detecting the change in context, inserting, between code for the query operation and code for the one or more previous query operations in the sequence of query operations, adaptor code configured to decompose a data chunk output by the one or more previous query operations into a plurality of rows of data that the query operation is able to operate on.

13. The computer-readable storage medium of claim 12, wherein the context for translating the query operation comprises a non-code generating mode, when the query operation comprises a pre-compiled query operation.

14. The computer-readable storage medium of claim 13, further comprising:
responding to the change in the context between the translating of the query operation and the translation of the one or more previous query operations comprising code-generating query operations by at least inserting, between the code for the query operation and the code for the one or more previous query operations, adaptor code configured to recompose a plurality of rows of data output by the one or more previous query operations into one or more data chunks that the query operation is able to operate on.

* * * * *